US006705261B2

(12) United States Patent
Haghgooie et al.

(10) Patent No.: US 6,705,261 B2
(45) Date of Patent: Mar. 16, 2004

(54) MULTI-VALVE ENGINE WITH GAS EXCHANGE CHANNEL BETWEEN INLET PORTS

(75) Inventors: Mohammad Haghgooie, Ann Arbor, MI (US); William Francis Stockhausen, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/214,343

(22) Filed: Aug. 7, 2002

(65) Prior Publication Data

US 2003/0047163 A1 Mar. 13, 2003

Related U.S. Application Data

(63) Continuation-in-part of application No. 09/631,132, filed on Aug. 2, 2000.

(51) Int. Cl.[7] ................................................. F01L 1/26
(52) U.S. Cl. ................. 123/90.23; 123/90.1; 123/90.11
(58) Field of Search .......................... 123/90.1, 90.11, 123/90.15, 90.23, 432, 429, 184.52, 184.59, 308, 306; 251/129.01, 129.15, 129.16

(56) References Cited

U.S. PATENT DOCUMENTS

| 4,318,380 A | * | 3/1982 | Matsumoto | 123/432 |
| 4,708,098 A | * | 11/1987 | McCracken | 123/308 |
| 5,463,995 A | * | 11/1995 | Sakai et al. | 123/432 |
| 6,155,229 A | * | 12/2000 | Cantrell, Jr. et al. | 123/336 |
| 6,425,357 B2 | * | 7/2002 | Shimizu et al. | 123/90.16 |
| 6,553,961 B2 | * | 4/2003 | Hammoud et al. | 123/308 |

OTHER PUBLICATIONS

Pierson et al., Computer Simulation of Inlet Port Helps Improve fuel Economy and Emissions, Fluent Inc., Dec. 12, 1999, www.fluent.com.*
Kaufmann et al., Supercomputing and the Transformation of Science, Scientific American library, 1993.*

* cited by examiner

Primary Examiner—Thomas Denion
Assistant Examiner—Ching Chang
(74) Attorney, Agent, or Firm—Artz & Artz; Carlos L. Hanze

(57) ABSTRACT

An intake valve phase shift in multi-valve engines to enhance air-fuel mixing and optimum combustion at all operating conditions. The intake valve members are independently operated by electro-mechanical actuators or the like, and activated and deactivated by the electronic controller of the engine. A channel or passageway in a diverter member positioned between the two intake ports in the cylinder head allows air and fuel from a closed intake port to be diverted to an open intake port and thus into the combustion chamber. The passageway preferably has a configuration with a certain curvature, orientation and position relative to the diameter of the inlet ports. The curvature is about one-half the diameter D of the inlet port, the passageway is symmetrical from port to port and directs the fuel toward the opposite sides of the ports, and the passageway is positioned about D/4 from the valve seats.

11 Claims, 2 Drawing Sheets

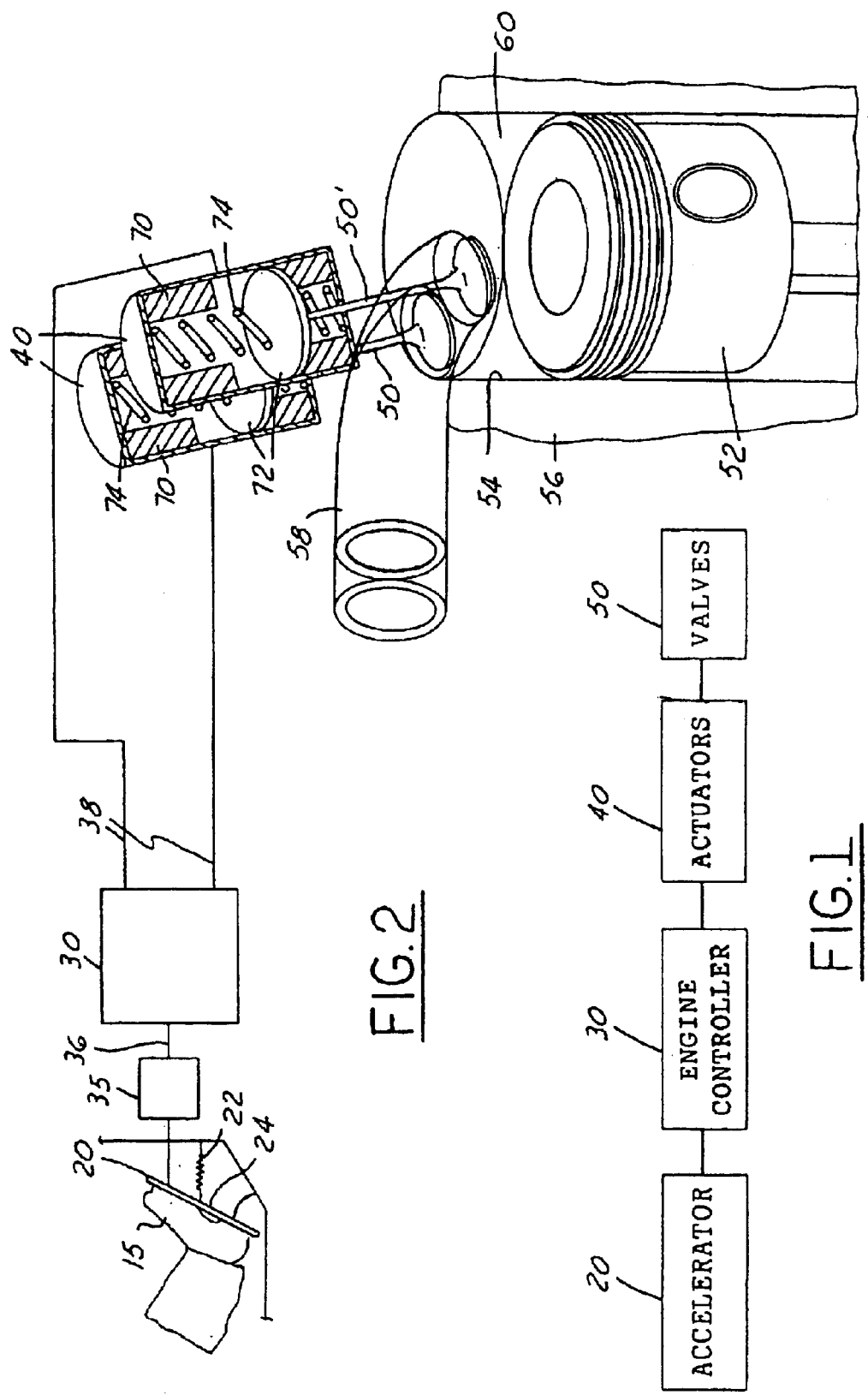

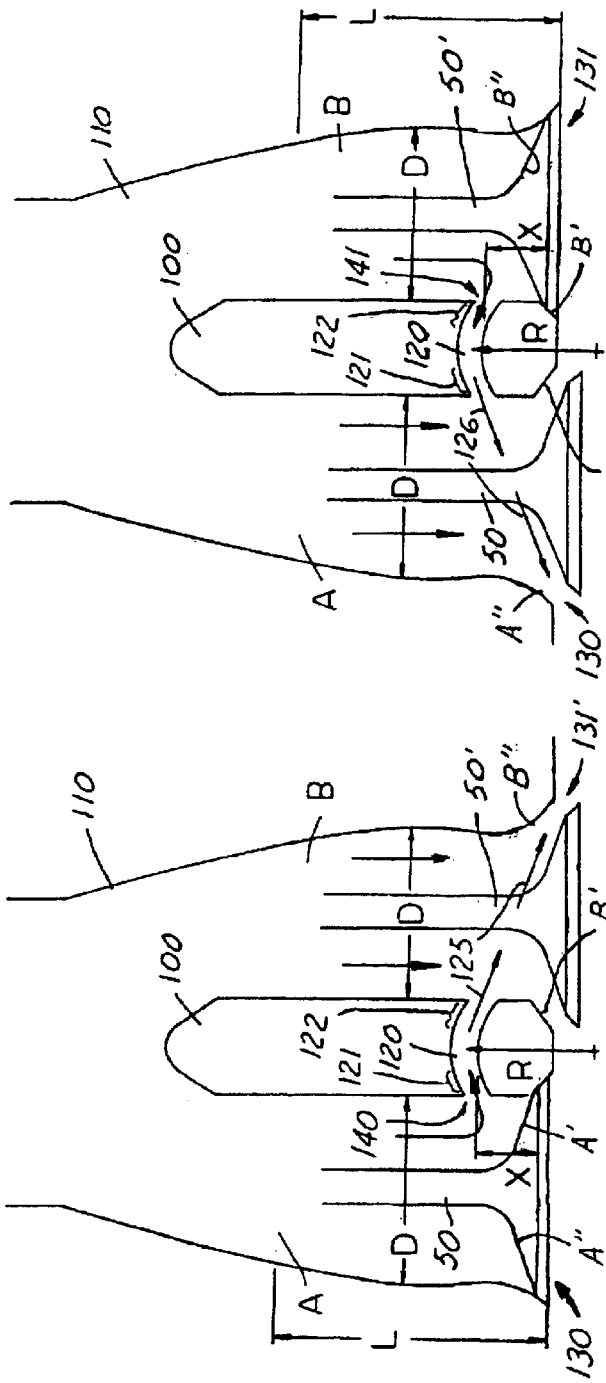

MULTI-VALVE ENGINE WITH GAS EXCHANGE CHANNEL BETWEEN INLET PORTS

CROSS REFERENCE TO RELATED APPLICATIONS

This is a continuation-in-part of U.S. patent application Ser. No. 09/631,132 filed on Aug. 2, 2000.

TECHNICAL FIELD

The present invention relates to intake valve systems for multi-valve engines, and more particularly to methods and apparatus for enhancing air-fuel mixing and charge motion in the combustion chamber of the engine.

BACKGROUND OF THE INVENTION

It is a common goal with vehicle manufacturers today to provide engine and combustion systems which improve fuel economy and, at the same time, reduce undesirable emissions. There are many systems which have been developed which accomplish one or more of these goals and achieve satisfactory results. Some of these systems include, for example, supplying prespecified amounts of fuel and air at certain times in the combustion cycle of the engine, various combustion chamber configurations including shaped bowls in the piston head in order to secure desired air-fuel mixtures under various operating conditions, intake and exhaust valve mechanisms which create desired tumble and/or swirl patterns of air and air-fuel mixtures in the combustion chamber, and the like. Some of these systems are used in particular for spark ignited (SI) engines.

Charge motion in the combustion chamber is an important factor for generating turbulence which in turn enhances the burn rate in the engines. However, the tumble and/or swirl generation often comes at the expense of discharge coefficient, thus reducing the maximum power output of the engine.

In multi-valve camless engines or in multi-valve engines with valvetrains where either intake valve can be independently controlled or deactivated, alternating the operation of the intake valves can improve fuel economy and enhance combustion. However, accumulated and unburnt fuel in the closed port can have an undesirable effect on emissions.

Thus, there is a need for an engine combustion system which enhances air-fuel mixing and charge motion in the combustion, particularly in camless engines.

SUMMARY OF THE INVENTION

It is an object of the present invention to provide an improved combustion system for an engine. It is another object of the present invention to provide gas exchange between two intake ports in multi-valve engines. It is a further object of the present invention to provide a combustion system which secures high fuel efficiency and at the same time reduces undesirable emissions.

The present invention provides a system and apparatus for eliminating the build up of unburnt fuel in the closed intake port in multi-valve engines, such as camless engines or engines with valvetrains where either intake valve can be independently controlled or deactivated. In accordance with the present invention, a multi-valve engine is provided with at least two independently operated intake valves in each cylinder. A high swirl and tumble turbulence flow is provided in the combustion chamber by delaying or advancing the opening of one intake valve relative to the other. Each of the intake valves is operated by an electromechanical actuator which in turn is activated by the engine controller.

A diverter member or intake port wall is positioned in the air intake passageway between the two intake ports and valve members. A channel or passageway is provided in the diverter member in order to transfer fuel from the closed port to the open port.

The passageway preferably has a configuration with a certain curvature relative to the size of the inlet ports. Preferably, the radius of this curvature is about one-half the diameter of the inlet port. In addition, the passageway is symmetrical relative to the two inlet ports which allows flexibility of use between either inlet port. This is particularly important in camless engines and engines wherein either intake valve can be independently controlled or deactivated. Further, the entrances to the passageways are positioned a certain distance from the valve seats relative to the size of the inlet ports. Preferably, this distance is about one-quarter of the diameter of the inlet ports. Finally, the exit portions of the passageway are curved or angled in order to direct the flow passing through the passageway toward the opposite sides of the inlet ports.

The present invention has the flexibility to achieve the proper timing of the opening and closing of the intake valves to secure optimum combustion of the fuel under all operating conditions. The opening and closing of the intake valves is varied by the engine controller and is dependent on the engine speed and engine load. The present invention also provides optimum location, symmetry and configuration of the passageway between the inlet ports.

The passageway in the diverter member allows transfer of fuel from one port to the other in order to enhance the use and burning of the fuel and to reduce undesirable emissions.

BRIEF DESCRIPTION OF THE DRAWINGS

FIG. 1 is a flow diagram which schematically depicts the overall system in accordance with the present invention;

FIG. 2 is a schematic illustration of the various components of the present invention;

FIGS. 3A, 3B, and 3C illustrate representative operation of the intake valves; and FIGS. 4A and 4B illustrate a diverter member in accordance with the present invention.

DESCRIPTION OF THE PREFERRED EMBODIMENT(S)

The formation of swirl or tumble forms of air/fuel mixtures in combustion chambers is important for increasing the burn rate of the fuel in spark ignited (SI) engines. In tumble air-flows, the motion is generated about an axis which is transverse to the longitudinal axis of the piston and piston cylinder. Swirl air flows involve the generation of a circular or rotational pattern of air flow which rotates about an axis which is parallel to the longitudinal axis of the piston and piston cylinder.

In many cases, the generation of the tumble and/or swirl flows of air comes at the expense of the discharge coefficient, thus reducing or degrading the power output of the engine. The present invention generates high swirl and tumble air flows by delaying or advancing the operation and opening of one intake valve relative to the other in the multi-valve engine and does not degrade the discharge coefficient.

In light load conditions, the engine speed and load are at a lower requested value by the engine or vehicle operator, and adequate mixing motion is generated through the deactivation of one or the other of the intake valves. The intake port and intake valve configuration is designed to provide maximum rates of combustion of the air-fuel mixture and thus increase thermal efficiency and reduce undesirable emissions.

At full load conditions, that is where maximum speed and power of the engine is desired, the timing of the valves is arranged in order to provide a high turbulence flow rate in the combustion chamber. This maximizes the power output of the engine.

A schematic flow diagram of the components and system of the present invention is shown in FIG. 1, while a schematic illustration of the various components of the system are shown in FIG. 2. FIGS. 3A–3C depict a representative operation of the intake valves.

In use, the present invention is responsive to the demands of the operator. In this regard, the operator will activate the engine accelerator at 20 which in turn will send a signal to the engine control unit (ECU) 30. Preferably, the accelerator is electronically activated relative to the engine and thus is part of a "drive by wire" system. For this purpose, a spring member 22 is secured to the accelerator pedal 24 in order to provide a tactile feedback to the engine operator 15.

In many cases, the movement of the accelerator pedal 24 is registered in an accelerator response mechanism 35 which correlates the linear movement of the accelerator pedal into an appropriate signal 36 which is sent to the ECU 30. The ECU in turn sends appropriate signals 38 to the electromechanical actuators 40 which operate the intake valves 50.

As indicated, the present invention is used with multi-valve engines. These are engines which have at least two intake valves in each of the cylinders of the engine. In the schematic illustration shown in FIG. 2, a representative piston 52 is positioned in a cylinder 54 in a vehicle engine 56. The two intake valves 50 and 50' are positioned at the interface of air intake passageway 58 and the engine cylinder 54. A fuel injector (not shown) is used to introduce fuel into the upper area 60 of the cylinder 54, either into and through the air inlet passageways, or directly into the combustion chamber. A spark plug (not shown) is positioned in the cylinder 54 in order to provide the necessary ignition source for the fuel introduced into the combustion chamber 60.

The amount of fuel injected into the combustion chamber 60 by the fuel injector member is dependent upon the speed of the vehicle as desired by the operator, as well as the resultant load required by the engine to achieve that speed. At low load conditions, a smaller volume of gas or fuel is injected into the combustion chamber by the fuel injector members, while at higher loads, greater amounts of fuel are injected.

The electromechanical actuators 40 include solenoid members 70 which are used to longitudinally activate armature members 72 attached to the ends of the intake valve members 50 and 50'. Coil spring members 74 are used to bias the valve intake members 50 and 50' toward their closed or seated positions in the cylinder head. In the closed or seated positions, the intake valve members do not allow air in the intake passageway 58 to enter the combustion chamber 60.

As shown in FIGS. 3A, 3B, and 3C, one or both of the intake valve members 50, 50', can be raised (closed) or lowered (opened) depending upon the engine speed and load. In FIG. 3A, intake valve member 50' is opened allowing air to flow from the intake passageway into the combustion chamber, while intake valve member 50 remains in its closed or seated position. This creates a particular pattern of air flow in the combustion chamber 60, depending on the size, position, and angle of inclination of the air passageway 58.

In FIG. 3B, intake valve member 50 is in its open position, while intake valve member 50' is in its closed or seated position. This configuration creates another air flow configuration in the combustion chamber, again depending on the particular size and configuration of the air intake passageway. Finally, in FIG. 3C, both valve intake members 50 and 50' are shown in their open (lowered) conditions. This allows the maximum amount of air to enter the combustion chamber and further results in another air flow configuration in the combustion chamber.

Further, time phasing of opening and closing the valve members relative to each other can create additional air flows in the combustion chamber.

In order to determine the appropriate air flow or turbulence in the combustion chamber, the particular engine in question is evaluated and analyzed. The opening and closing of the valve members, and the particular degree of opening and sequence of opening of one valve member relative to the other can be determined to achieve the optimum combustion of the fuel in the combustion chamber under all operating conditions of the engine. In this regard, each engine is calibrated with respect to engine speed and load in order to provide the optimum combustion for all operating conditions. The present invention has the flexibility to achieve the proper timing and secure the optimum combustion of each engine under all operating conditions.

With the present invention, primarily a tumble-type flow of air is secured in the combustion chamber of the engine. However, the air flow also has a swirl aspect to it which is also needed in most engines in order to achieve proper turbulence for optimum combustion. In this regard, an opening of only one of the two intake valve members 50, 50' can secure a combined swirl and tumble flow of air, while opening both valve members at the same time would primarily produce a tumble-flow of air.

A multi-valve engine with independently controlled valves, as shown, has a number of advantages. The number of operating valves at any given speed or load can be selected to optimize the energy consumption and performance. Under such conditions, it is necessary to distribute the fuel directed toward both intake ports. In typical multi-valve engines, only a single fuel injector mechanism is utilized for each cylinder of the engine. Thus, if one of the intake valve members is deactivated for a period of time during the valve alternating mode, it is possible for the fuel in the disabled valve port not to be introduced into the combustion chamber or engine cylinder. This, in turn, alters the desired air-fuel ratio, especially on engine load transients. This also can impact the emissions generated by the engine.

A mechanism for overcoming that concern is shown in FIGS. 4A and 4B. An intake port divider 100 is located in the air passageway 110 and used to divide air into two portions, one for each of the two intake ports A and B. Intake valve members 50 and 50' are positioned in the two intake ports.

In accordance with the present invention, an air/fuel exchange channel 120 is provided in the diverter or divider member 100. The exchange channel or passageway 120 between the intake ports A and B is positioned immediately behind the intake valves. The channel or passageway 120 enables fuel in the deactivated port to be transferred into the activated port during valve opening. As shown in FIG. 4A, intake valve member 50 is in its closed or seated position, while intake valve member 50' is open. In this situation, the gasoline entrapped in the air flow proceeding down passageway 110 toward port A which normally would pass through port A is diverted through passageway 120 into port B of the air passageway 110 and toward the open intake valve member 50'. The opposite situation is shown in FIG. 4B, where intake valve member 50 is open and intake valve member 50' is closed. In this situation, air and fuel which normally would enter the combustion chamber through the port associated with intake valve member 50' is diverted through passageway 120 into the portion of the air passageway 110 servicing open intake valve member 50.

The transfer of air and fuel from one side of the air intake passageway 110 to the other is induced by a pressure difference as established by the air velocity gradient across the passageway 120. Furthermore, with a proper channel design, it is possible to introduce a jet flow into the open valve to generate and enhance the flow field in a combustion chamber, thus assisting in generating the turbulence in the combustion chamber and subsequent combustion of fuel.

As shown in FIGS. 4A and 4B, the curvature of the passageway 120 is uniform or symmetrical between the two inlet ports A and B. In this manner, fuel which exists in or is distributed to the intake port which is not being utilized or activated can be transferred equally to the other port. Thus, if port A is deactivated, the fuel can be transferred to port B just as easily and equally as when port B is deactivated and the fuel needs to be transferred over to port A. This feature is particularly important in camless engines and in engines which have valvetrains wherein either intake valve can be independently controlled or deactivated.

In addition, the curvature or angle of the exit portions 121, 122 of the passageway 120 is provided in order to direct the fuel passing through the passageway toward the far or opposite side of the inlet port. As exemplified in FIGS. 4A and 4B, each inlet port A, B respectively has a first portion A', B' adjacent to the channel 120 and a second portion A", B" opposite to the respective first portion A', B". By this example, fuel passing from inlet port A through passageway 120 is directed by exit portion 122 towards the second portion B" of inlet port B, as shown by arrows 125. Similarly in FIG. 4B, fuel passing from inlet port B through passageway 120 is directed by exit portion 121 towards the second portion A" of inlet port A, as shown by arrows 126. This feature helps disperse the fuel flow more uniformly in the receiving port and enhances the overall combustion of the fuel while at the same time reduces the formation of undesirable emissions.

The shape or curvature of the passageway 120, as well as its position relative to the valve seats is also significant. Preferably, the passageway 120 has a curved shape or configuration at least along the central portion between the two exit portions 121 and 122. (The two exit portions 121 and 122 can have straight configurations in order to assure that the fuel is directed towards opposite sides A' and B' of the valve seats.) In this regard, the curvature or radius R of the passageway 120 (measured along its centerline) is preferably about one-half the diameter D of the inlet ports A and B (R=D/2). If the cross-sectional diameter of the inlet port is not circular or varies along the length L of the section of the inlet port adjacent the valve seats 130, 131, then "D" can be the average diameter or the mean diameter as determined in an efficient and accurate manner. A person of ordinary skill in the art will understand the distinction between an average value and a mean value. Specifically, an average value is a number that merely typifies a set of values in a group. Different kinds of average values include a median value, a mode value, and a mean value. The mean value is the sum of all values in the group is divided by the number of values in that group. The median is the middle-most value of a set when the values are ordered by rank. Also, the mode is the most frequently occurring value of the set. In this regard, it will be appreciated that the average diameter "D" can be measured according to various methods. To insure smooth passage of fuel through the passageway 120, the radius R can range from one-third to two-thirds of the diameter D (i.e. R >D/3 and R <2D/3).

The preferred distance of the passageway 120 from the valve seat is also shown in FIGS. 4A and 4B. This distance is shown by "X" and is measured from the center of the exit ends 140, 141 of the passageway to the center of the valve seats 130, 131. Preferably, X≦D/4, that is, the distance X is less than or approximately equal to one-fourth of the diameter D of the inlet ports A, B. (Again, the diameter D can be a mean or average measurement depending on the actual cross-sectional configurations of the inlet ports.) This maintains the passageway close to the valve seats which allows better pickup and transfer of fuel from the deactivated port to the activated port. The passageway 120 should not be positioned so close to the valve seats, however, that fuel could be undesirably transferred from one port to the other. Thus, the distance X should not be less than about D/8. The optimum distance X can be calculated and determined for each particular engine, depending on its characteristics and performance.

The downwardly angled exit portions 121, 122 of the passageway 120 also help prevent fuel positioned or introduced into one of the inlet ports A, B from migrating or passing in an unwanted or unintentional manner to the other port. The positions and shapes of the ends of the passageway also allow the fuel to be picked-up more easily when desired and further provide for a more efficient evacuation or fuel from the deactivated port.

Although specific configurations of air passageways and intake valve members are shown, it is understood that the present invention can be utilized in any multi-valve engine having any form of air passageways or intake valve members. Also, the electromechanical activators 40 shown in the drawings are by way of example only. Any known or equivalent type of activators for opening and closing intake valve members can be utilized, and the present invention is not restricted to any particular one of them. Also, the present invention is not limited to engines which have "drive-by-wire" accelerator systems. The present invention can be utilized with any type of accelerator system in which the speed and load of the engine are adjusted depending on the needs and desires of the vehicle operator.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A system for enhancing air-fuel mixing and charge motion in a combustion chamber of a multi-valve engine, said engine having an inlet passageway, first and second intake valve members in the passageway, said valve members being removably positioned in valve seats and each valve member being independently activated by an actuator member, the system comprising a divider member positioned in said inlet passageway between said first and second intake valve members and forming first and second inlet ports, said divider member having a channel therein for passage of air and fuel from one side of the divider to the other, said channel having two ends and a central portion therebetween, said two ends of said channel disposed on opposing sides of said divider member, said central portion having a centerline and a curvature measured about said centerline, said curvature and said ends each being positioned to direct air and fuel passing through said channel towards said valve seats in each of said first and second inlet ports, said curvature and said ends providing a combined swirl-and-tumble flow.

2. The system as set forth in claim 1 wherein each of said first and second inlet ports have a first portion adjacent said divider member and a second portion opposite to said first portion, and wherein said ends of said channel direct air and fuel passing through said channel towards said second portions of said first and second inlet ports.

3. The system as set forth in claim 1 wherein said first and second inlet ports each have a cross-section with a diameter D and wherein said curved configuration has a radius R which is about one-half said diameter D of said first and second inlet ports.

4. The system as set forth in claim 1 wherein said first and second inlet ports each have a cross-section with a diameter D and wherein said curved configuration has a radius R which is in the range: $D/3 < R < 2D/3$.

5. The system as set forth in claim 4, wherein diameter D is the mean diameter along the length L of the first and second inlet ports.

6. The system as set forth in claim 4 wherein diameter D is the average diameter along the length L of the first and second inlet ports.

7. The system as set forth in claim 1 wherein said first and second inlet ports each have a cross-section with a diameter D and said channel is positioned a distance X from said valve seats, wherein X is less than or equal to D/4.

8. The system as set forth in claim 7 wherein X further is greater than D/S.

9. The system as set forth in claim 1 wherein said first and second inlet ports each have a cross-section with a diameter D and said channel is positioned a distance X from said valve seats, wherein $D/8 < X < D/4$.

10. The system as set forth in claim 7 wherein diameter D is the mean diameter along the length L of the first and second inlet ports.

11. The system as set forth in claim 7 wherein diameter D is the average diameter along the length L of the first and second inlet ports.

* * * * *